United States Patent
Ji et al.

(10) Patent No.: US 10,779,276 B2
(45) Date of Patent: Sep. 15, 2020

(54) SELF-CONTAINED SLOT AND SLOT DURATION CONFIGURATION IN NR SYSTEMS

(71) Applicant: Apple Inc., Cupertino, CA (US)

(72) Inventors: Zhu Ji, San Jose, CA (US); Yang Li, Plano, TX (US); Yuchul Kim, Santa Clara, CA (US); Johnson O. Sebeni, Fremont, CA (US); Sami M. Almalfouh, San Jose, CA (US); Wei Zeng, San Diego, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/357,844

(22) Filed: Mar. 19, 2019

(65) Prior Publication Data

US 2019/0306856 A1    Oct. 3, 2019

Related U.S. Application Data

(60) Provisional application No. 62/650,989, filed on Mar. 30, 2018.

(51) Int. Cl.

| | |
|---|---|
| *H04L 12/28* | (2006.01) |
| *H04W 72/04* | (2009.01) |
| *H04W 76/10* | (2018.01) |
| *H04W 84/04* | (2009.01) |

(52) U.S. Cl.
CPC ....... *H04W 72/0446* (2013.01); *H04W 76/10* (2018.02); *H04W 72/0413* (2013.01); *H04W 84/042* (2013.01)

(58) Field of Classification Search
CPC ........................................................ H04L 12/28
(Continued)

(56) References Cited

U.S. PATENT DOCUMENTS

| | | |
|---|---|---|
| 2018/0132264 A1 | 5/2018 | Jung |
| 2018/0167965 A1 | 6/2018 | Wang |

(Continued)

FOREIGN PATENT DOCUMENTS

| | | |
|---|---|---|
| EP | 2 680 651 A1 | 1/2014 |
| EP | 3 107 343 A1 | 12/2016 |
| WO | WO 2017/172452 | 10/2017 |
| WO | WO2018127761 A1 | 7/2018 |

(Continued)

OTHER PUBLICATIONS

Extended European Search Report, European Patent Application 19165797.2, dated Jul. 8, 2019, 12 pages.

(Continued)

*Primary Examiner* — Dang T Ton
(74) *Attorney, Agent, or Firm* — Kowert, Hood, Munyon, Rankin & Goetzel, P.C.

(57) ABSTRACT

Apparatuses, systems, and methods to dynamically indicate preference for self-contained slots and slot duration by a user equipment device (UE) in communication with a base station (e.g., a gNB) using a 5G NR radio access technology. A UE may determine to send an indication to a gNB indicating a preference for self-contained slots and slot duration for downlink and/or uplink communications utilizing one or more of the physical downlink control channel (PDCCH), the physical downlink shared channel (PDSCH), and/or acknowledgement messaging (ACK/NACK) for downlink communications, and utilizing one or more of the physical uplink control channel (PUCCH), the PDCCH, and/or the physical uplink shared channel (PUSCH) for uplink communications. The configuration of self-contained slots and slot duration for uplink and/or downlink may be based on one or more of average packet size, average packet rate, traffic type and UE processing capabilities.

20 Claims, 5 Drawing Sheets

(58) Field of Classification Search
USPC .......................................................... 370/329
See application file for complete search history.

(56) References Cited

U.S. PATENT DOCUMENTS

2018/0234955 A1    8/2018  Lin
2020/0077437 A1*   3/2020  Stern-Berkowitz .... H04B 7/068

FOREIGN PATENT DOCUMENTS

WO    WO2018224041 A1   12/2018
WO    WO2018227164 A1   12/2018

OTHER PUBLICATIONS

Nokia et al; "On HARQ/scheduling timing and self-contained operation"; 3GPP Draft;R1-1701019; 3rd Generation Partnership Project (3GPP), Mobile Competence Centre; 650, Route Des Lucioles; F-06921 Sophia-Antipolis Cedex; France; vol. RAN WG1, No. Spokane, WA, USA; Jan. 16, 2017; six pages.

Qualcomm Inc et al; "UE Preferred C-DRX Cycle Reporting for VoLTE"; 3GPP Draft; R2-165680; 3rd Generation Partnership Project (3GPP), Mobile Competence Centre; 650, Route Des Lucioles; F-06921 Sophia-Antipolis Cedex; France; vol. RAN WG2, No. Goteborg, Sweden; Aug. 21, 2016; four pages.

Apple Inc; "Control Information for UE Power Saving"; 3GPP Draft; R1-1714092; 3rd Generation Partnership Project (3GPP), Mobile Competence Centre; 650, Route Des Lucioles; F-06921 Bophia-Antipolis Cedex; France; vol. RAN WG1, No. Prague, Czech; Aug. 20, 2017; six pages.

Vivo; "Discussion on NR UE supporting self-contained operation"; R1-1710394; 3rd Generation Partnership Project (3GPP), Mobile Competence Centre; 650, Route Des Lucioles; F-06921 Sophia-Antipolis; vol. RAN WG1, No. Qingdao, P.R. China; Jun. 26, 2017; three pages.

* cited by examiner

SELF-CONTAINED SLOT AND SLOT DURATION CONFIGURATION IN NR SYSTEMS

PRIORITY CLAIM

This application claims priority to U.S. Provisional Patent Application No. 62/650,989, titles "Self-Contained Slot and Slot Duration Configuration in NR Systems" and filed on Mar. 30, 2018, which is hereby incorporated by reference in its entirety, as though fully and completely set forth herein.

FIELD

The present application relates to wireless devices, and more particularly to apparatus, systems, and methods for a wireless device to dynamically configure self-contained slots and slot duration in 5G New Radio (NR) systems.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from media access control (MAC) and higher layers. LTE also defines a number of physical layer channels for the uplink (UL).

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow increased flexibility in time resource allocation for uplink and/or downlink message scheduling. According, to take advantage of the increased flexibility, improvements in the field may be desirable.

SUMMARY

Embodiments relate to apparatuses, systems, and methods to dynamically indicate preference for self-contained slots and slot duration by a user equipment device (UE) in communication with a base station (e.g., a gNB) using a 5G NR radio access technology.

In some embodiments, a UE may determine to send an indication to a gNB indicating a preference for self-contained slots and slot duration for downlink communications utilizing one or more of the physical downlink control channel (PDCCH), the physical downlink shared channel (PDSCH), and/or acknowledgement messaging (ACK/NACK).

In some embodiments, a UE may determine to send an indication to a gNB configuring self-contained slots and slot duration for uplink communications utilizing one or more of the physical uplink control channel (PUCCH), the PDCCH, and/or the physical uplink shared channel (PUSCH).

In some embodiments, a UE may determine to send a single indication to a gNB simultaneously configuring self-contained slots and slot duration for both uplink and downlink communications.

In some embodiments, the configuration of self-contained slots and slot duration for uplink and/or downlink may be based on one or more of average packet size, average packet rate, traffic type and UE processing capabilities.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
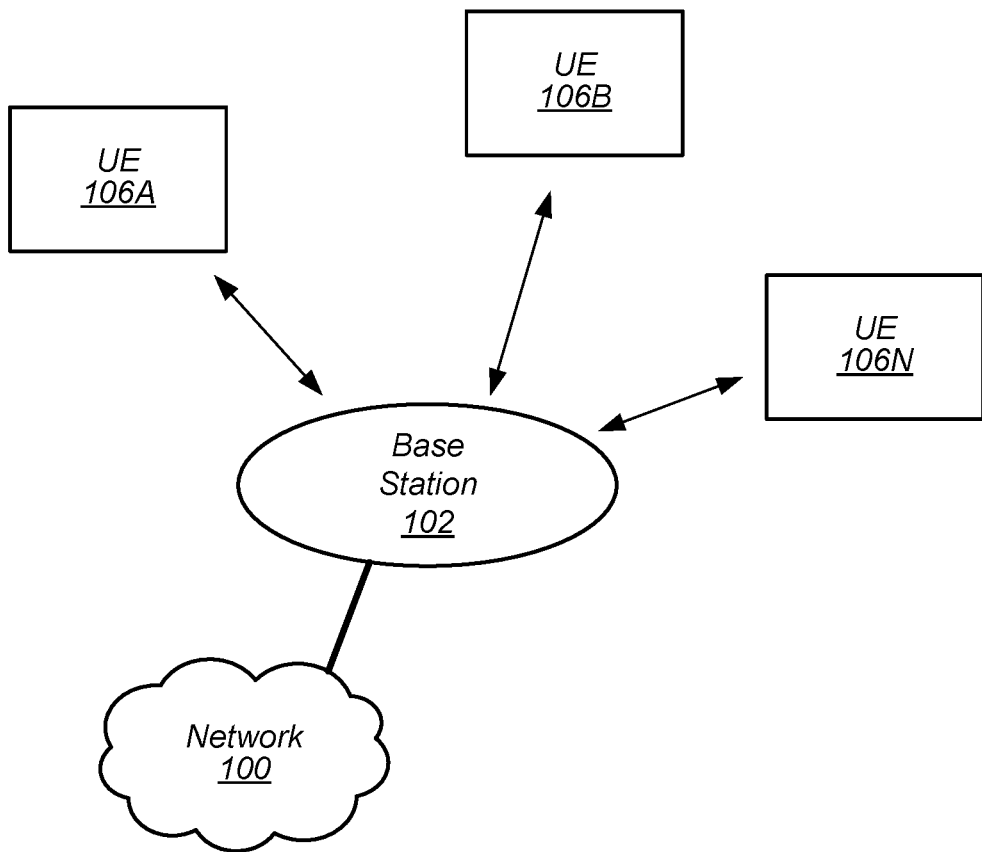
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory and circuitry, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
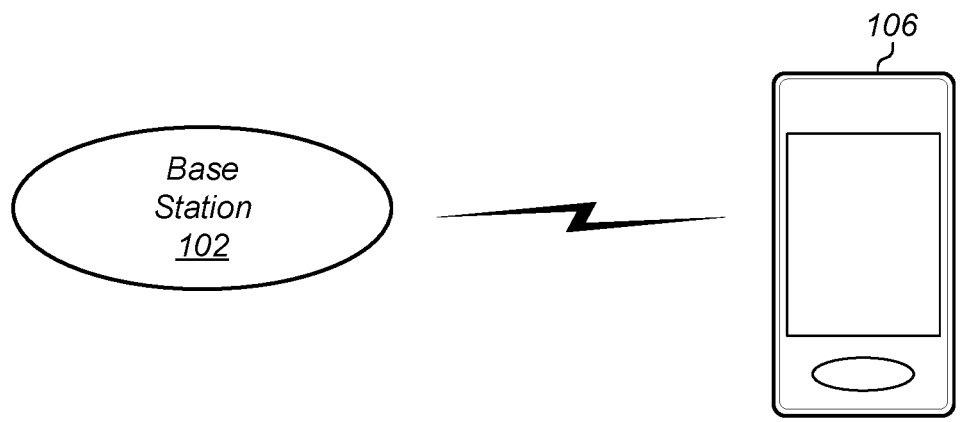
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" or "user equipment device" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
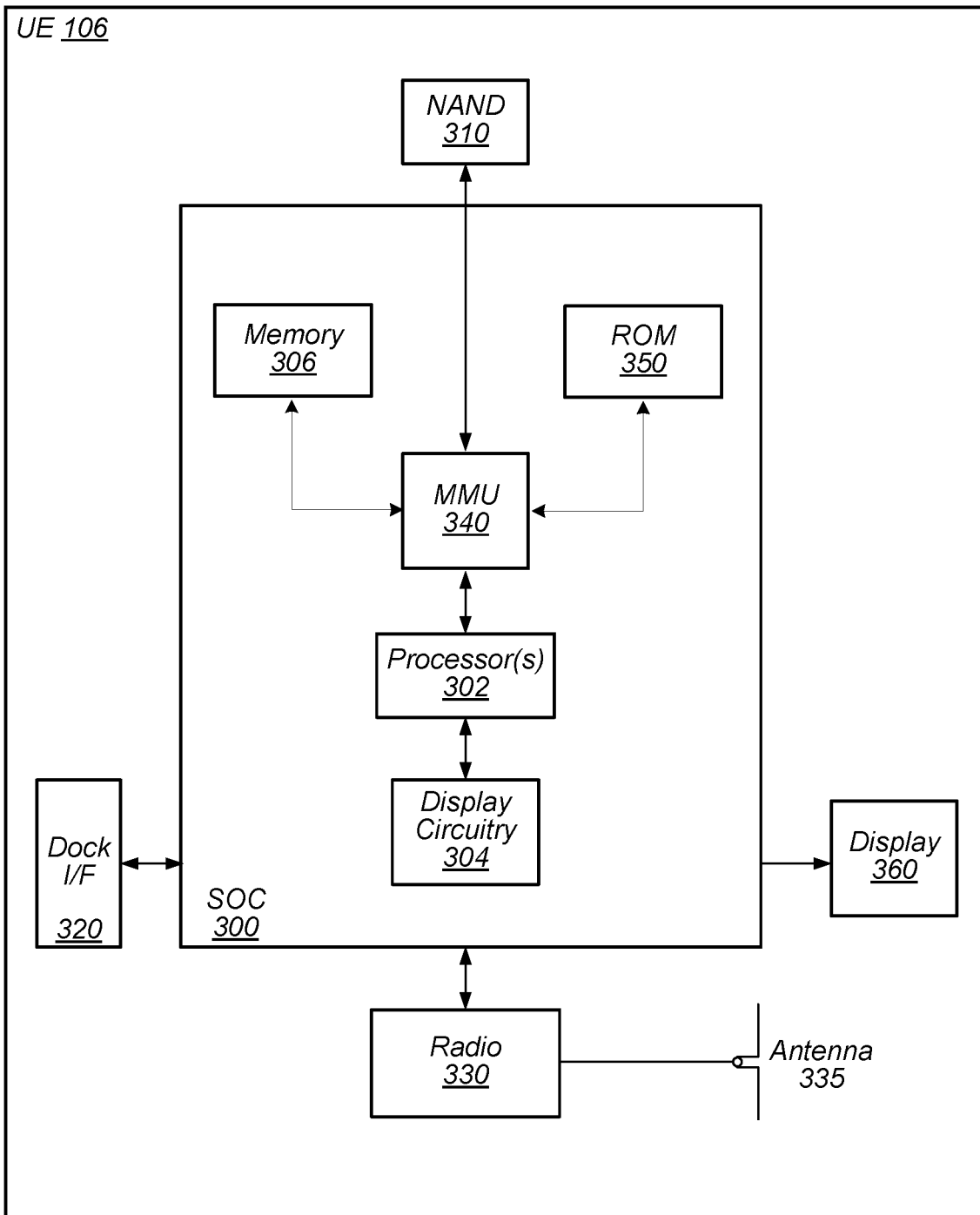
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform a method including performing one or more of periodic beam quality measurements and/or event based beam quality measurements, determining, based at least in part on one or more of the periodic beam quality measurements and/or the event based beam quality measurements, a recommended beam quality measurement configuration, and transmitting, to a base station serving the UE, the recommended beam quality measurement configuration. In addition, the UE may perform receiving, from the base station, instructions regarding the beam quality measurement configuration. The instructions may include instructions to activate, deactivate, and/or modify at least one beam quality measurement configuration. In addition, the instructions may be based, at least in part, on the recommend beam quality measurement configuration.

As described herein, the communication device 106 may include hardware and software components for implementing the above features for recommending a beam quality measurement configuration. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
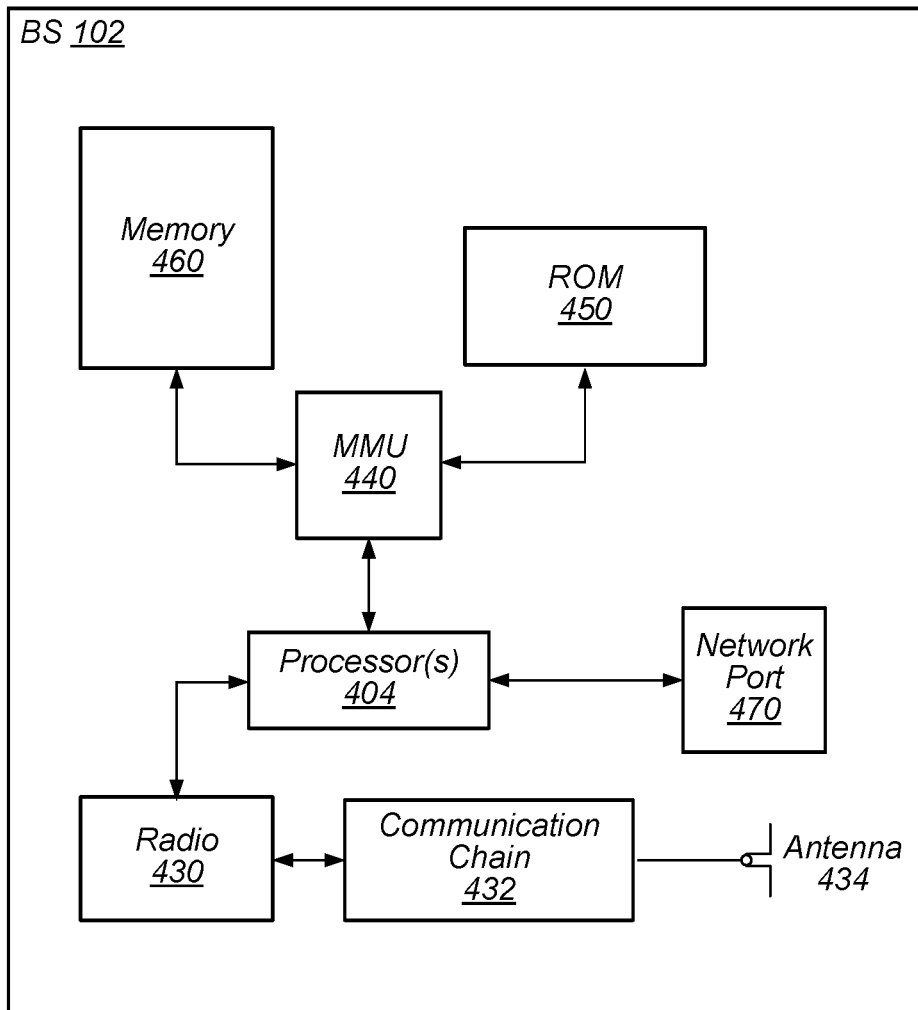
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Resource Allocation in Time Domain

In wireless downlink or uplink communications, a control message scheduling an upcoming payload transmission may be transmitted in the physical download control channel (PDCCH) during a first period of time, referred to herein as a "slot", and the scheduled payload transmission may be transmitted in the physical downlink shared channel (PDSCH) during a subsequent period of time (i.e., in a subsequent second slot). For downlink communication, the UE may furthermore transmit an acknowledgment message (ACK/NACK) to the base station indicating whether the payload transmission was successfully received in a (third) subsequent slot. In 5G NR, it is anticipated that scheduling of uplink and downlink messages may be dynamic, such that the relative timing and slot allocation of message scheduling and message transmission may vary over time. In some embodiments, a self-contained slot may be constructed whereby one or more of the scheduling control message in the PDCCH, the message payload in the PDSCH, and the acknowledgment message may all be transmitted within a single slot. Additionally, the base station may be able to dynamically adjust the duration of the slot. Embodiments herein describe devices and methods to dynamically configure self-contained slots and slot duration in uplink and downlink 5G NR communications.

Various parameters and equations may be utilized to determine timing of message transmission. As one specific example, the relative start of a physical downlink shared channel (PDSCH) message may be dynamically signaled in a scheduling DCI message through the value of a $K_0$ parameter. Furthermore, the duration of the PDSCH may be dynamically signaled through the value of a L parameter. In some embodiments, when a UE is scheduled to receive PDSCH by a DCI, the time domain PDSCH resources field of the DCI may provide a row index of a radio resource control (RRC) configured table [pdsch-symbolAllocation], where the indexed row may define the slot offset $K_0$, the start and length indicator SLIV, and the PDSCH mapping type to be assumed in the PDSCH reception. The slot allocated for the PDSCH may be determined by $K_0$ of the indexed row $n+K_0$, where n is the slot with the scheduling DCI, and $K_0$ is based on the numerology of PDSCH. The starting symbol S relative to the start of the slot, and the number of consecutive symbols L counting from the symbol S allocated for the PDSCH may be determined from the start and length indicator SLIV of the indexed row according the following equation:

if $(L-1) \leq 7$, then SLIV=14 $(L-1)+S$, else

SLIV=14*$(14-L+1)+(14-1-S)$, where $0 < L \leq 14-S$.

In some embodiments, when the UE is configured with a downlink aggregation factor (aggregation-factor-DL) greater than 1, the same symbol allocation may be applied across the aggregation-factor-DL consecutive slots not defined as uplink (UL) by the slot format indication.

The parameters and equations above are intended to illustrate one particular way of determining start time and duration of the PDSCH, as other parameters and/or equations may also be used to determine PDSCH configuration. More generally, it may be appreciated that various parameters may be used by a base station to determine the start time of both PDSCH communications relative to the PDCCH, and the start time of acknowledgment messaging relative to the PDSCH, as well as the duration of time allocated to a slot for the PDSCH (and potentially other) communications.

Similarly, it is anticipated that in NR, the relative start of PUSCH and its scheduling downlink control information (DCI) may be dynamically signaled via a $K_2$ parameter, and the duration of the PUSCH may be signaled via L. When the UE is scheduled to transmit PUSCH by a DCI, the time-domain PUSCH resources field of the DCI may provide a row index of an RRC configured table [pusch-symbolAllocation], where the indexed row defines the slot offset $K_2$, the start and length indicator SLIV, and the PUSCH mapping type to be applied in the PUSCH reception. As one particular example, the slot where the UE transmits the PUSCH may be determined by $K_2$ of the indexed row as $$\left( n \cdot \frac{2^{\mu PUSCH}}{2^{\mu PDCCH}} \right) + K_2,$$

where n is the slot with the scheduling DCI, K is based on the numerology of PUSCH, and the starting symbol S relative to the start of the slot, and the number of consecutive symbols L counting from the symbol S allocated for the PUSCH may be determined from the start and length indicator SLIV of the indexed row. For example, these parameters may be determined by the following equation, among other possibilities.

if $(L-1) \leq 7$, then SLIV=14 $(L-1)+S$, else

SLIV=14*$(14-L+1)+(14-1-S)$, where $0 < L \leq 14-S$.

The parameters and equations above are intended to illustrate one particular way of determining start time and duration of the PUSCH, as other parameters and/or equations may also be used to determine PUSCH configuration. More generally, it may be appreciated that various parameters may be used by a base station to determine the start time of PUSCH communications (which contain the uplink data payload) relative to the PUCCH (which contains scheduling for the uplink data payload), as well as the duration of time allocated to a slot for the PUSCH (and potentially other) communications.

Additionally, parameters may be dynamically adjusted based on UE PDSCH processing time. For example, it is anticipated that in NR, the parameters K1 and N1 may be used to specify the start time for transmission of ACK/NACK messaging subsequent to the end of a payload transmission via PDSCH. The relative start time of ACK/NACK messaging may additionally be implicitly impacted by the configuration of parameters $\mu_{DL}$ and $\mu_{UL}$, which are related to demodulation reference signal (DM-RS) configurations. The processing time required by a particular UE for a particular average packet size may be used to determine how soon after reception of a packet via the PDSCH a UE may be able to send ACK/NACK messaging.

For example, if the first symbol to carry the HARQ-ACK information starts no earlier than at symbol $K_1$, the UE may provide a valid HARQ-ACK message, where $K_1$ may be defined as the next uplink symbol with its $C_P$ starting after $((N_1+d_1)(2048+144)*C_{SCS}+N_{TA})*T_C$ after the last symbol of the PDSCH carrying the TB being acknowledged. The parameter $C_{SCS}$ may be defined such that, if $\mu_{UL}<\mu_{DL}$, then $C_{SCS}=\kappa*2^{-\mu_{UL}}$, and if $\mu_{UL}>\mu_{DL}$, then $C_{SCS}=\kappa*2^{-\mu_{DL}}$. Furthermore, the parameter $d_1$ may be set equal to zero if the HARQ-ACK is transmitted on PUCCH, and $d_1$ may be set equal to 1 if the HARQ-ACK is transmitted on PUSCH. Otherwise, the UE may not provide a valid HARQ-ACK corresponding to the scheduled PDSCH.

$N_1$ may be defined as illustrated below in Tables 1 and 2 depending on processing capabilities of the UE, where $N_1$ and $K_1$ may be based on $\mu_{DL}$ of Table 1 that corresponding to the minimum of $\mu_{PDSCH}$ and $\mu_{PUSCH}$ when the HARQ-ACK is to be transmitted on PUSCH. Table 1 illustrates an example of processing time for a UE with a first processing capability, while Table 2 illustrates processing time for a UE with a second processing capability.

TABLE 1

PDSCH Processing Time for PDSCH Processing Capability 1

| | PDSCH decoding time $N_1$ (symbols) | |
| --- | --- | --- |
| $\mu_{DL}$ | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

TABLE 1

PDSCH Processing Time for PDSCH Processing Capability 2

| | PDSCH decoding time $N_1$ (symbols) | |
| --- | --- | --- |
| $\mu_{DL}$ | No additional PDSCH DM-RS configured | Additional PDSCH DM-RS configured |
| 0 | [2.5-4] | [12] |
| 1 | [2.5-6] | [12] |

While the above examples, equations, and tables describe a particular methodology for determining a PDSCH slot duration from UE processing capabilities, it may be appreciated that, more generally, a UE may determine the amount of processing time required for various types of uplink and/or downlink communications, and may determine an appropriate slot duration for PDSCH and/or PUSCH depending on the particular latency associated with a currently active communication. In general, it may be advantageous for a UE to reduce the slot duration for PDSCH and/or PUSCH communications as much as possible while still allowing enough time for processing of the downlink and/or uplink message, respectively.

In order to conserve power expenditure by a UE, it may be advantageous to reduce the UE active duration while maintaining the same UL and DL data rate, in which case the UE may be able to enter a deeper sleep state with less power consumption. For example, because the amount of time required for a UE to enter into a deeper sleep state may increase when the power consumption associated with the sleep state increases, the UE may be able to enter a deeper sleep if there is a longer inter-grant time. Consolidating two or more of the PDCCH (or PUCCH), PDSCH (or PUSCH), and the ACK/NACK messaging into a single slot may reduce the number of times that the UE is required to wake up from a sleep or lower power state, hence increasing the power savings associated with entering a sleep or low power state.

In some embodiments, the UE active duration may be controlled by a base station such as the gNB. The gNB may consider many factors in determining the UE active duration, such as traffic type, CDRX configurations, decoding delay at UE and gNB, and ACK/NACK monitoring, among other possibilities. When the UE is transmitting and/or receiving small and/or sporadic packets, the decoding delay may be small enough so that the UE may be able to reduce the slot duration by sending an associated ACK/NACK message during the same slot as the data payload. Self-contained slots are anticipated to be defined in NR for Ultra-Reliable and Low Latency Communications (URLLC) applications. Self-contained slots may be utilized to save power, with slot duration adjusted depending on characteristics of the transmission and processing capabilities of the UE.

Figure 5:
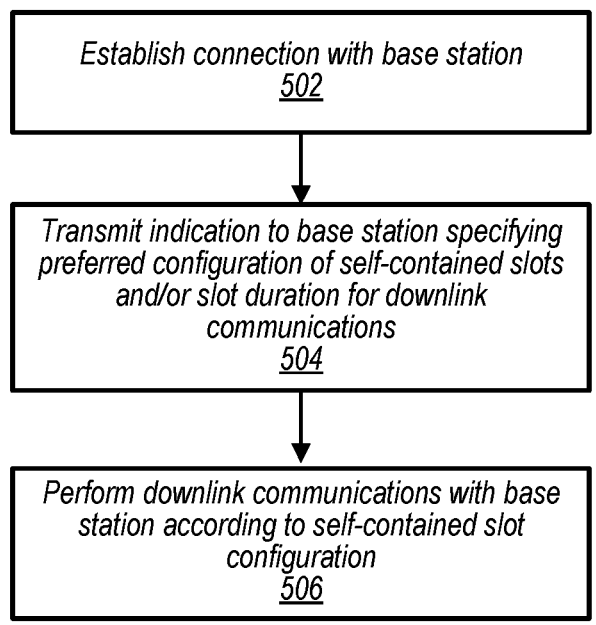
FIG. 5 is a flowchart diagram illustrating a method for a UE to configure self-contained slots and slot duration in downlink communications, according to some embodiments.

FIG. 5—Self-Contained Slots and Slot Duration for Downlink (DL)

FIG. 5 is a flowchart diagram illustrating a method for configuring self-contained slots and slot duration by a UE for downlink communications. The methods described in reference to FIG. 5 may be implemented by a UE 106 or a processor including circuitry comprised within a UE, such as those illustrated in FIG. 3, among other possibilities. In various embodiments, some of the elements of the scheme shown may be performed concurrently, in a different order than shown, or may be omitted. Additional and/or alternative elements may also be performed as desired. As illustrated, the method of FIG. 5 may operate as follows.

At 502, the UE may establish a connection with a base station. In some embodiments, the base station may be a gNB, and the connection may be a radio resource control (RRC) connection using a 5G NR radio access technology. Other types of base stations and/or connections are also possible.

At 504, the UE may transmit an indication to the base station specifying a preference to configure self-contained slots and/or slot duration for downlink communications using the established connection. In various embodiments, the indication may specify a preference by the UE to receive downlink packets through the PDSCH in the same slot as corresponding control messages are received in the PDCCH, and/or the indication may specify a preference to transmit acknowledgment messages in the same slot as the downlink packets received through the PDSCH. The indication may further specify a preferred duration of the slot associated with the PDSCH.

The indication may be transmitted based at least in part on a determination by the UE that the UE's average DL packet size is less than a first predetermined number ($N_d$) of bytes, and/or based on a determination that the average arrival rate of packets is less than a second predetermined number ($R_d$) of packets per minute. As one example, if the UE's average DL packet size is small enough such that, according to the UE's processing capabilities, the UE is able to finish receiving and decoding an average DL packet and transmit an associated acknowledgment message within the duration of a single slot, the UE may configure the self-contained slot such that the PDSCH and the ACK/NACK occur in the same slot. Additionally or alternatively, the indication may indicate a preference that upcoming control messages (e.g., transmitted via the PDCCH) scheduling a downlink message are transmitted in the same slot that the downlink message is scheduled (e.g., via the PDSCH). In other words, the indication may indicate a preference that a self-contained slot is constructed wherein the PDCCH scheduling a downlink message and the PDSCH containing the downlink message scheduled in the PDCCH are allocated to a single slot.

Additionally or alternatively, the indication may specify a preferred duration of the slot associated with the PDSCH based on the anticipated processing time required for an average sized DL packet. The transmission of an indication to configure a self-contained slot for PDSCH and PDCCH may be performed based on a determination that the processing time of the UE to process a control message in the PDCCH, in conjunction with the processing time to process an average sized payload message, is sufficiently short to perform both within the duration of the slot. Additionally or alternatively, the duration of the slot may be adjusted to accommodate the processing time of the average sized DL packet. In some embodiments, as described in further detail below, the indication may be transmitted further based at least in part on a traffic type associated with currently active downlink messaging, and/or on a type of application currently running on the UE, wherein the application is anticipated to receive downlink messages.

The indication may communicate to the base station a preferable set of parameters that are configured via radio resource control (RRC), including one or more of slot format (for example, as specified in 3GPP TS 38.211), $K_0$, $K_1$, $\mu_{DL}$, and $\mu_{UL}$ (for example, as specified in 3GPP TS 38.214). For example, as described in greater detail above, the communicated parameters may be used by the base station to configure the start time of PDSCH relative to PDCCH, the duration of PDSCH, and/or the start time of ACK/NACK messaging relative to PDSCH.

In some embodiments, the indication may notify the base station that the UE has a preference to initiate a self-contained slot where ACK/NACK messages are sent in the same slot that associated downlink messages are received in PDSCH. Additionally or alternatively, the indication may include a set of preferred parameters that reduce the slot duration, where the indication is selected by the UE at least partially based on the average packet size, by reducing the duration of the PDSCH and ACK/NACK. Advantageously, the time duration required for the UE to receive a downlink message and transmit an ACK/NACK message may be reduced based on current downlink configuration, thus increasing power savings as the UE may enter a deeper sleep or low power state. In some embodiments, the indication may further specify a duration (i.e., a number of DRX cycles) to communicate according the configuration specified by the indication.

At 506, in response to transmitting the indication to the base station, the UE may perform downlink communications with base station according to self-contained slot configuration and/or duration. For example, in response to the indication from the UE, the base station may configure downlink communications with the UE according to the indicated preference received from the UE. The UE may then perform subsequent downlink communications according to the self-contained slot configuration and/or duration. For example, the UE may receive control information via the PDCCH, may receive downlink payload messaging via the PDSCH, and/or may transmit acknowledgment messaging within a single self-contained slot. The downlink communications may be performed according to the reduced slot duration specified by the indication transmitted to the gNB. The UE may continue to communicate with the base station according to the self-contained slot configuration and duration for multiple successive cycles (e.g., DRX cycles) of PDCCH/PDSCH communications. In some embodiments, further efficiencies may be obtained if the control information received via the PDCCH further comprises a blanking DCI message, as described in further detail below.

In some embodiments, the UE may continue to perform multiple cycles of subsequent downlink communications according to the self-contained slot configuration and/or duration. At a later time, the UE may determine that an alternative self-contained slot configuration and/or duration is desirable, and may send a second indication expressing a preference to reconfigure the downlink communications according to a second set of parameters. The gNB may then reconfigure downlink communications according to the second set of parameters in response to receiving the second indication, and the UE may perform downlink communications according to the reconfiguration.

A blanking DCI (bDCI) message may specify a duration associated with a start slot and an end slot during which the UE is not expected to monitor the downlink control channel (PDCCH). In some embodiments, the blanking DCI and a self-contained slot may be used jointly. If a UE receives a bDCI message and a self-contained slot configuration, it may complete DL grant decoding and ACK/NACK transmission in the same slot, and then enter a deeper sleep mode for the duration specified by the bDCI message. If a self-contained slot is configurated without utilizing a bDCI message, the UE may still monitor the PDCCH after completing an ACK/NACK transmission, which may cause the UE to stay in a higher power state, expending more energy.

Alternatively, if a bDCI message is utilized without configuring a self-contained slot, the UE may remain in a higher power state until the ACK/NACK is transmitted. Accordingly, power savings may be improved by jointly employing both bDCI messaging and self-contained slots.

Figure 6:
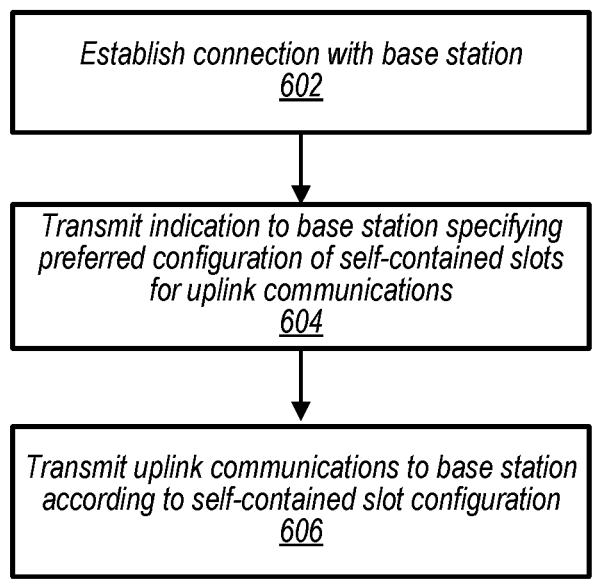
FIG. 6 is a flowchart diagram illustrating a method for a UE to configure self-contained slots and slot duration in uplink communications, according to some embodiments.

FIG. 6—Self-Contained Slot and Slot Duration for Uplink (UL)

FIG. 6 is a flowchart diagram illustrating a method for configuring self-contained slots and slot duration by a UE for uplink communications. The methods described in reference to FIG. 6 may be implemented by a UE 106 or a processor including circuitry comprised within a UE, such as those illustrated in FIG. 3, among other possibilities. In various embodiments, some of the elements of the scheme shown may be performed concurrently, in a different order than shown, or may be omitted. Additional and/or alternative elements may also be performed as desired. As shown, the method of FIG. 6 may operate as follows.

At 602, the UE may establish a connection with a base station. In some embodiments, the base station may be a gNB, and the connection may be a radio resource control (RRC) connection using a 5G NR radio access technology. Other types of base stations and/or connections are also possible.

At 604, the UE may transmit an indication to the base station specifying a preference to configure self-contained slots and/or slot duration for uplink communications using the established connection. For example, the indication may specify a preferable set of parameters indicating a particular configuration of self-contained slots and/or slot duration. In various embodiments, the indication may specify a preference of the UE to transmit uplink packets through the PUSCH in the same slot as corresponding scheduling control messages are transmitted in the PUCCH or PDCCH (i.e., it may configure a self-contained slot), and/or the indication may specify a preferred duration of the slot used for PUCCH, PDCCH, and/or PUSCH communications. For example, the indication may specify a preferred time and/or duration of a slot corresponding to an upcoming uplink message to be transmitted via the PUSCH, and it may specify a preference that the slot is the same slot within which scheduling information is transmitted via the PUCCH or PDCCH.

In some embodiments, the indication may be transmitted to the base station via the PUSCH, and it may signal to the base station that the UE desires to configure self-contained slots and/or specify the slot duration for the PUCCH, PDCCH, and/or PUSCH in subsequent DRX cycles. In other embodiments, the indication may be included in the PUCCH. In these embodiments, a special design format may be utilized to incorporate the indication into the PUCCH, or the existing PUCCH control messaging may be overridden with the indication to notify the gNB of the enablement of self-contained slots and/or the preferred slot duration.

The indication may be transmitted based at least in part on a determination by the UE that the UE's average UL packet size is less than a first predetermined number ($N_u$) of bytes, and/or based on a determination that the average arrival rate of packets is less than a second predetermined number ($R_u$) of packets per minute. For example, if the average UL packet size is such that, given the processing capabilities of the UE, the UE is able to transmit uplink control information via the PUCCH and transmit uplink payload communications via the PUSCH within a single slot duration, the UE may transmit the indication to configure a single self-contained slot for both the PUCCH and the PUSCH. In some embodiments, the indication may lengthen or shorten the duration of the self-contained slot to accommodate the processing time associated with each of the PUCCH and the PUSCH. In some embodiments, and as described in further detail below, the indication may be transmitted further based at least in part on a traffic type associated with the uplink message to be transmitted via the PUSCH, and/or on a type of application currently running on the UE, which is anticipated to transmit uplink messages.

In some embodiments, the indication may be associated with a set of parameters that are configured via RRC, including one or more of slot format (for example, as specified in 3GPP TS 38.211), $K_2$, $\mu_{DL}$, and $\mu_{UL}$. In some embodiments, the indication may notify the base station that the UE prefers to communicate with a reduced PUSCH duration, and/or that the UE prefers that the start time of PUSCH transmission is moved closer to the scheduling request transmitted through PUCCH (e.g., it may be moved to occur in the same slot as the PUCCH). In other embodiments, the UE may transmit a scheduling request to transmit an uplink message via the PUCCH, and the gNB may respond with a scheduling grant for the uplink message via the PDCCH. In these embodiments, the indication may specify a preference of the UE to transmit the uplink message in a PUSCH that is in the same slot as the PDCCH which scheduled the uplink message. In some embodiments, the indication may further specify a preferred duration (i.e., a number of DRX cycles) to communicate according the configuration specified by the indication.

At 606, in response to transmitting the indication to the base station, the UE may perform uplink communications with base station according to self-contained slot configuration, and/or according to the configured slot duration. For example, in response to the indication from the UE, the base station may configure uplink communications with the UE according to the indicated preference received from the UE. The UE may then perform subsequent uplink communications according to the self-contained slot configuration and/or duration. For example, the UE may transmit control information via the PUCCH and may transmit uplink payload messaging via the PUSCH within a single self-contained slot. Alternatively or additionally, the UE may receive a scheduling grant via the PDCCH and may transmit uplink payload messaging via the PUSCH within a single self-contained slot. The uplink communications may be performed according to a reduced slot duration specified by the indication transmitted to the gNB.

In some embodiments, the UE may continue to communication with the base station according to the self-contained slot configuration and/or duration for multiple successive cycles (e.g., DRX cycles) of communications. At a later time, the UE may determine that an alternative self-contained slot configuration and/or duration is desirable, and may send a second indication expressing a preference to reconfigure the uplink communications according to a second set of parameters. The gNB may then reconfigure uplink communications according to the second set of parameters in response to receiving the second indication, and the UE may perform uplink communications according to the reconfiguration.

Self-Contained Slots and Slot Duration for DL and UL

In some embodiments, self-contained slots and slot duration may be simultaneously configured by a UE for both uplink and downlink communications. For example, when a UE's average UL and DL packet size is less than a first predetermined number ($N_a$) of bytes, and/or when the average arrival transmission/reception rate of UL/DL packets is less than a second predetermined number ($R_a$) of packets per minute, the UE may send an indication to gNB to configure self-contained slots and/or slot duration for both UL and DL communications. For example, the transmitted indications described above in reference to step 504 of FIG. 5 and step 604 of FIG. 6 may be combined into a single indication that specifies a preference to configure self-contained slots and/or slot duration for both downlink and uplink communications. In these embodiments, the indication may be associated with a set of parameters that are configured via RRC, including one or more of slot format, (e.g., as specified by 3GPP TS 38.211), $K_0$, $K_1$, $K_2$, $\mu_{DL}$, and $\mu_{UL}$ (e.g., as specified in 3GPP TS 38.214). By implementing self-contained slot configuration and slot duration with a single indication, the average overall UE active duration upon communicating via PDCCH/PUCCH and PDSCH/PUSCH may be reduced.

UE Selection of Preferable Slot Configuration

In some embodiments, the UE may indicate a preferable slot configuration (e.g., self-contained slots and/or slot duration) based on the traffic types associated with currently active UL and/or DL communications. For example, voice-over LTE (VoLTE), email, background traffic, and iMessage may all be associated with a particular slot configuration and duration, among other possibilities. The preferable parameter set indicated by the UE may specify the slot length, gap between self-contained slots, and other parameters. Each of the traffic types may have a preferred configuration of a self-contained slot and/or slot duration, as variously discussed above. Table 3 below summarizes an example of preference indications and configuration sets corresponding to various traffic types, according to one embodiment. Other configurations of self-contained slots and/or slot duration may be established for other traffic types, in other embodiments. The UE may determine a traffic type, and hence a configuration to indicate according to the methods described in reference to FIGS. 5 and 6, based at least in part on a type of application currently running on the UE (e.g., if the application is anticipated to transmit and/or receive a particular type of uplink and/or downlink communications.

TABLE 3

Preference Indications and Configuration Sets for Traffic Types

| Preference Indication | Configuration Set | Traffic type (up to UE's definition) |
|---|---|---|
| 0 | DL configuration | Email |
| 1 | DL/UL configuration | iMessage |
| 2 | DL/UL configuration | VoLTE |

Self Contained Slot Power Saving with Blanking DCI Messaging

As explained above, if data is grouped into smaller number of DL and/or UL transmissions, inter-grant time may be increased. Increasing inter-grant time may then enable the UE to enter a deeper state of sleep with lower power consumption, thus decreasing power expenditure. In some embodiments, proactively configuring self-contained slots by the UE to save power in downlink communications may be combined with blanking DCI (bDCI) messaging to further facilitate UE power saving. For example, a blanking DCI message may be transmitted to a UE indicating an inter-grant time (i.e., a time until next grant, or an upcoming window of time without scheduled grants) wherein the UE may enter a lower power or sleep mode, to reduce energy expenditure. In these embodiments, the bDCI message may be included with the scheduling information included in the PDCCH.

The following numbered paragraphs describe additional embodiments.

In some embodiments, a method is performed by a user equipment device (UE), the method comprising establishing a connection with a base station, transmitting an indication to the base station indicating a preference for a set of slot configuration parameters, and conducting communications with the base station according to the set of slot configuration parameters at least in part in response to transmitting the indication.

In some embodiments, the set of slot configuration parameters correspond to one or more of: a self-contained slot for a physical downlink control channel (PDCCH) and a physical downlink shared channel (PDSCH) for downlink messaging, a self-contained slot for the PDSCH and acknowledgment messages for downlink messaging, a self-contained slot for the PDCCH and a physical downlink shared channel (PUSCH) for uplink messaging, a duration of a slot used for PDSCH downlink messaging, and a duration of a slot used for PUSCH uplink messaging.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   by a user equipment device (UE),
   establishing a connection with a base station;
   transmitting an indication to the base station indicating a preference for a slot configuration for an upcoming communication between the UE and the base station, wherein the slot configuration specifies that the UE transmits an acknowledgment message in a same slot as a downlink packet received through the physical downlink shared channel (PDSCH), wherein the acknowledgment message indicates whether the downlink packet was successfully received; and
   communicating with the base station according to the indicated slot configuration at least in part in response to transmitting the indication.

2. The method of claim 1,
   wherein communicating with the base station according to the indicated slot configuration comprises transmitting the acknowledgment message by the UE to the base station.

3. The method of claim 2,
   wherein the indicated slot configuration comprises one or more of:
   a preferred duration of a slot corresponding to transmission of the acknowledgment message; and
   a preferred time of the slot corresponding to transmission of the acknowledgment message, wherein the preferred time is specified relative to a control message scheduling the uplink message.

4. The method of claim 3, wherein the preferred duration of the slot is determined by the UE based at least in part on an average packet size of downlink messages received from the base station.

5. The method of claim 3, wherein the indication further indicates a preference that an upcoming control message scheduling the downlink packet is transmitted in the same slot that the downlink packet is scheduled.

6. The method of claim 1, further comprising:
   determining that an average packet size or an average arrival rate of downlink messages received from the base station is below a predetermined threshold; and
   wherein transmitting the indication to the base station is performed at least in part in response to determining that the average packet size or the average arrival rate of downlink messages received from the base station is below the predetermined threshold.

7. The method of claim 1, wherein the indication specifies one or more of:
   a slot format;
   a value of a K0 parameter;
   a value of a K1 parameter;
   a value of a $\mu_{DL}$ parameter; and
   a value of a $\mu_{UL}$ parameter.

8. The method of claim 1, further comprising:
   determining a traffic type associated with the upcoming communication between the UE and the base station,
   wherein the indication is transmitted based at least in part on the traffic type associated with the upcoming communication between the UE and the base station.

9. The method of claim 8, wherein the traffic type comprises one of:
   email;
   internet protocol (IP) text messaging;
   voice-over long term evolution (VoLTE) communications; and
   ultra-reliable low latency communications (URLLC).

10. The method of claim 1, the method further comprising:
    receiving a blanking downlink control information (bDCI) indication from the base station indicating that the UE is not expected to monitor for control messages for a first period of time.

11. An apparatus, comprising:
    a processor including circuitry configured to cause a user equipment device (UE) to:
    establish a connection with a base station;
    transmit an indication to the base station indicating a preference for a slot configuration for an upcoming communication between the UE and the base station, wherein the slot configuration specifies that the UE transmits an acknowledgment message in a first slot, wherein a downlink packet is received through the physical downlink shared channel (PDSCH) in the first slot, wherein the acknowledgment message indicates whether the downlink packet was successfully received; and
    transmit the acknowledgement message during the first slot at least in part in response to transmitting the indication.

12. The apparatus of claim 11,
    wherein the processing circuitry is further configured to cause the UE to:
    determine that an average packet size of uplink messages transmitted to the base station is below a predetermined threshold; and
    wherein the processing element is configured to cause the UE to transmit the indication to the base station at least in part in response to determining that the average packet size of uplink messages transmitted to the base station is below the predetermined threshold.

13. The apparatus of claim 11,
    wherein the processing circuitry is further configured to cause the UE to:
    determine that an average transmission rate of uplink messages transmitted to the base station is below a predetermined threshold; and
    wherein the processing element is configured to cause the UE to transmit the indication to the base station at least in part in response to determining that the average transmission rate of uplink messages transmitted to the base station is below the predetermined threshold.

14. The apparatus of claim 11, wherein the indication specifies one or more of:
    a slot format;
    a value of a K2 parameter;
    a value of a $\mu_{DL}$ parameter; and
    a value of a $\mu_{UL}$ parameter.

15. The apparatus of claim 11, wherein the indication further indicates a preferred duration of the first slot, wherein the preferred duration of the slot is determined by the processing element based at least in part on an average packet size of uplink messages received from the base station.

16. The apparatus of claim 11, wherein the indication further indicates a preference that an upcoming control message scheduling the uplink message is transmitted in the first slot.

17. A user equipment device (UE), comprising:
    an antenna;
    a radio coupled to the antenna; and
    a processor including circuitry and coupled to the radio;
    wherein the UE is configured to:

establish a connection with a base station;

transmit an indication to the base station indicating a preference that an upcoming acknowledgment message is to be transmitted by the UE in a first slot, wherein a downlink message corresponding to the acknowledgment message is scheduled to be received in the first slot, and wherein the acknowledgement message indicates whether the downlink message was successfully received; and transmit the acknowledgment message in the first slot at least in part in response to transmitting the indication.

18. The UE of claim 17, wherein the UE and the base station operate according to a 5G New Radio (NR) radio access technology.

19. The UE of claim 17, wherein the UE is further configured to:

determine that an average packet size of downlink messages received from the base station is below a predetermined threshold; and wherein the UE is configured to transmit the indication to the base station at least in part in response to determining that the average packet size of downlink messages received from the base station is below the predetermined threshold.

20. The UE of claim 17, wherein the indication further indicates a preferred duration of the slot, and wherein the duration of the slot is determined by the UE based at least in part on an average packet size of downlink messages received from the base station.

* * * * *